US007014518B2

(12) United States Patent
Matsuda et al.

(10) Patent No.: US 7,014,518 B2
(45) Date of Patent: Mar. 21, 2006

(54) METHOD AND DEVICE FOR PROCESSING SELF-DIAGNOSTIC INFORMATION FOR PERSONAL WATERCRAFT

(75) Inventors: Yoshimoto Matsuda, Kobe (JP); Yoshinori Tsumiyama, Miki (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 10/864,828

(22) Filed: Jun. 8, 2004

(65) Prior Publication Data

US 2005/0010339 A1 Jan. 13, 2005

(30) Foreign Application Priority Data

Jun. 9, 2003 (JP) ............................ 2003-163194

(51) Int. Cl.
*G01M 15/00* (2006.01)

(52) U.S. Cl. .............................. 440/2; 701/21; 701/29

(58) Field of Classification Search .................... 440/2; 701/21, 29, 31

See application file for complete search history.

(56) References Cited

U.S. PATENT DOCUMENTS 6,116,971 A * 9/2000 Morikami ...................... 440/2
2003/0067384 A1* 4/2003 Funayose et al. ........... 340/438

FOREIGN PATENT DOCUMENTS

JP 09-257520 10/1997
JP 2002-225791 * 8/2002

OTHER PUBLICATIONS

Translation of JP 2002-225791-A.*

* cited by examiner

*Primary Examiner*—Sherman Basinger
(74) *Attorney, Agent, or Firm*—Alleman Hall McCoy Russell & Tuttle LLP

(57) ABSTRACT

A method and device for processing self-diagnostic information relating to an operating state of a jet-propulsion personal watercraft to display the self-diagnostic information on a display device equipped in the personal watercraft. The method typically includes the steps of obtaining operating state information relating to the operating state of the watercraft, performing self-diagnosis of the operating state of the watercraft based on the obtained operating state information to obtain diagnostic data, determining whether or not an abnormality exists in the diagnostic data, determining whether or not an operation condition of an engine mounted in the watercraft meets a predetermined operation condition, the engine being configured to propel the watercraft, and outputting information of the abnormality to the display device based on a result obtained in the step of determining whether or not the abnormality exists in the diagnostic data and based on a result obtained in the step of determining whether or not the engine meets the predetermined operation condition.

13 Claims, 9 Drawing Sheets

METHOD AND DEVICE FOR PROCESSING SELF-DIAGNOSTIC INFORMATION FOR PERSONAL WATERCRAFT

BACKGROUND OF THE INVENTION

1. Field of the Invention

The present invention relates to a method and device for processing self-diagnostic information relating to an operating state of a jet-propulsion personal watercraft to display the information.

2. Description of the Related Art

In recent years, jet-propulsion personal watercraft have been widely used in leisure, sport, rescue activities, and the like. The personal watercraft typically includes an engine mounted in a space within a watercraft surrounded by a hull and a deck. The personal watercraft is equipped with a water jet pump, and the engine drives the water jet pump, which pressurizes and accelerates water sucked from a water intake generally provided on a bottom surface of the hull and ejects it rearward from an outlet port. Thereby, the personal watercraft is propelled.

In the jet-propulsion personal watercraft, a steering nozzle is provided behind the outlet port of the water jet pump and swung either to the right or to the left by operating a bar-type steering handle to the right or to the left, to change the ejection direction of the water to the right or to the left, thereby turning the watercraft to right or to the left.

In some personal watercraft, a control unit mounted within a body of the watercraft has a function to self-diagnose a state of the engine or auxiliary devices therefor. After the personal watercraft is taken out of the water, a personal computer is connected to the control unit to obtain diagnostic information resulting from the self-diagnosis. But, in this case, connection of the personal computer to the control unit is troublesome. In addition, on the water, an operator cannot check the diagnostic information.

Japanese Laid-Open Patent Application Publication No. 9-257520 discloses a motorcycle configured to display information of an abnormal state on a liquid crystal display portion of a meter equipped on a steering handle. Japanese Laid-Open Patent Application Publication No. 2002-225791 discloses watercraft configured to display information of an abnormal state by pushing a display select switch in a predetermined manner.

In the motorcycle disclosed in the Publication No. 9-257520, upon occurrence of an abnormal state, the information of the abnormal state is displayed on a liquid crystal display portion of a meter regardless of whether or not the motorcycle is traveling. And, in the watercraft disclosed in the Japanese Laid-Open Patent Application Publication No. 2002-225791, it is necessary for an operator to operate the switch to cause the information of the abnormal state to be presented. Since the personal watercraft rises and falls unpredictably in heavy surf, it is relatively difficult for the operator to properly operate the switch in the predetermined manner to check the information of the abnormal state.

SUMMARY OF THE INVENTION

The present invention addresses the above-described condition, and an object of the present invention is to provide a method and device for processing self-diagnostic information in a jet-propulsion personal watercraft, which are capable of properly displaying the self-diagnostic information according to an operating state of the watercraft.

According to one aspect of the present invention, there is provided a method of processing self-diagnostic information relating to an operating state of a jet-propulsion personal watercraft to display the self-diagnostic information on a display device equipped in the personal watercraft, the method comprising the steps of obtaining operating state information relating to the operating state of the watercraft, performing self-diagnosis of the operating state of the watercraft based on the obtained operating state information to obtain diagnostic data, determining whether or not an abnormality exists in the diagnostic data, determining whether or not an operation condition of an engine mounted in the watercraft meets a predetermined operation condition, the engine being configured to propel the watercraft, and outputting information of the abnormality to the display device based on a result obtained in the step of determining whether or not the abnormality exists in the diagnostic data and based on a result obtained in the step of determining whether or not the engine meets the predetermined operation condition.

In accordance with the above method, since the information of the abnormality is output according to the operation condition of the engine, it is possible to properly display the information of the abnormality according to the operation condition of the engine when the abnormality occurs. For example, a low engine speed range may be preset as the predetermined operation condition. And, based on the result of determination as to whether or not the engine speed is within the set range, the information regarding the abnormality may be output to the display device when the watercraft is traveling at an engine speed within the low engine speed range.

In the above method, the step of outputting the information regarding the abnormality includes the steps of outputting abnormality content information indicating the content of the abnormality to the display device, when the operation condition of the engine meets the predetermined operation condition, and outputting abnormality existence information indicative of existence of the abnormality to the display device, when the operation condition of the engine does not meet the predetermined operation condition.

In the above method, the predetermined operation condition for determination of the operation condition of the engine may be set based on an engine speed of the engine.

Further, in the above method, a stopped state of the engine may be set as the predetermined operation condition.

In accordance with the above method, the abnormality existence information and the abnormality content information may be separately communicated to the operator according to the operation condition of the engine as the diagnostic data associated with the abnormality. When diagnostic data associated with the abnormality is obtained while the watercraft is traveling at a high speed, the abnormality existence information indicative of existence of the abnormality is simply communicated to the operator by displaying, for example, “ERROR”, lighting an LED, or emitting a sound by a buzzer, whereas the abnormality content information indicative of a specific content of the diagnostic data associated with the abnormality may be displayed while the watercraft is traveling at a low speed or in a stopped state. So, when the content of an abnormality is difficult to check, for example, while the watercraft is traveling at a high speed, the operator is informed of only a minimum of required information indicative of occurrence of the abnormality. Then, the operator may decrease the speed of the watercraft or stop the watercraft and, under this condition, may inspect the display to discover the specific content of the diagnostic data associated with the abnormality.

According to another aspect of the present invention, there is provided a device for processing self-diagnostic information relating to an operating state of a jet-propulsion personal watercraft including an engine configured to propel the watercraft, the device being mounted in the watercraft, the device comprising a control unit, a sensor configured to detect the operating state of the watercraft, and a display device equipped in the vicinity of a steering handle attached to the watercraft, the control unit including an engine operation determining module configured to determine whether or not an operation condition of the engine meets a predetermined operation condition, a self-diagnosis module configured to obtain a detected signal from the sensor, to perform self-diagnosis of the operating state of the watercraft based on the obtained detected signal to thereby obtain diagnostic data, and to determine whether or not an abnormality exists in the diagnostic data, and a self-diagnostic information output module configured to output the diagnostic data to the display device based on a result of determination made by the self-diagnosis module and a result of determination made by the engine operation determining module.

In accordance with the above device, since the diagnostic data is output to the display device according to the operation condition of the engine, it is possible to properly display diagnostic data according to the operation condition of the engine when an abnormality occurs.

In the above device, the self-diagnostic information output module may include an abnormality content information output module configured to output abnormality content information indicative of the content of the diagnostic data associated with the abnormality to the display device, when the operation condition of the engine meets the predetermined operation condition, and an abnormality existence information output module configured to output abnormality existence information indicative of existence of the abnormality to the display device, when the operation condition of the engine does not meet the predetermined operation condition.

In the above device, the predetermined operation condition for determination of the operation condition of the engine may be set based on an engine speed of the engine.

Further, in the above device, a stopped state of the engine may be set as the predetermined operation condition in the engine operation determination module.

In accordance with the above device, as the diagnostic data associated with the abnormality, the abnormality existence information and the abnormality content information may be separately communicated to the operator according to the operation condition of the engine. For example, while the watercraft is traveling at a high speed, the abnormality existence information may be output. And, when the operator decreases the speed of the watercraft or stops the watercraft, the abnormality content information may be output.

The device may further comprise a first display switching control configured to switch display information to be displayed on the display device, wherein the self-diagnostic information output module may be configured to, when the self-diagnosis module determines that a plurality of abnormalities exist, sequentially output abnormality content information indicative of contents of a plurality of diagnostic data associated with the abnormalities, based on an input signal from the first display switching control.

In accordance with such a configuration, by operating the first display switching control, typically by pushing an easy to operate push button control, information indicative of the contents of a plurality of information of the abnormality can be sequentially displayed, one by one, with each successive push of the control. Thus, the operator can be informed of all the contents of the plurality of abnormalities of the watercraft.

Alternatively, instead of sequentially displaying abnormality content information for the plurality of abnormalities by switching using the first display switching control, the abnormality content information for the plurality of abnormalities may be sequentially output to the display, each for a predetermined time period. In this manner, the display may scroll through information for each of the plurality of abnormalities automatically, and button operation can be omitted.

In the above device, the self-diagnostic information output module may be configured to, when the self-diagnosis module determines that no abnormality exists, output normal operating state information relating to the operating state of the watercraft, and when the self-diagnosis module determines that an abnormality exists, output abnormality existence information indicative of existence of the abnormality or abnormality content information indicative of the content of diagnostic data associated with the abnormality, instead of the normal operating state information.

In such a configuration, when no abnormality is detected from self-diagnosis, the operating state information (normal operating state information) relating to the operating state of the watercraft, such as a speed and a travel distance, are displayed on a meter or gauge as in normal driving operation of the watercraft. On the other hand, when an abnormality is detected from self-diagnosis, the information (abnormality existence information) indicative of existence of the abnormality or the information (abnormality content information) indicative of the content of the diagnostic data associated with the abnormality is displayed on the display device, instead of the normal operating state information. Thereby, a display device having only a limited area may serve to display both the normal operating state information and the abnormality existence information or the abnormality content information.

The device may further comprise a second display switching control configured to switch display information to be displayed on the display device, wherein the self-diagnostic information output module is configured to output the normal operating state information instead of the abnormality existence information or the abnormality content information according to an input signal from the second display switching control, even when the output module is outputting the abnormality existence information or the abnormality content information.

Thereby, when the operator operates the second display switching control to send an input signal to the output module even while self-diagnostic information is displayed, the normal operating state information such as the speed, the travel distance, and the like, is displayed on the display device.

In the above device, the self-diagnostic information output module may be configured to, when the self-diagnosis module determines that no abnormality exists, output normal operating state information relating to an operating state of the watercraft, when the self-diagnosis module determines that an abnormality exists and the abnormality existence information indicative of existence of the abnormality is to be output, output the abnormality existence information along with the normal operating state information, and when the self-diagnosis module determines that an abnormality exits and the abnormality content information indicative of the content of diagnostic data associated with the abnormality is to be output, output the abnormality content information instead of the normal operating state information.

For example, the abnormality existence information indicative of existence of the abnormality may be output by using an LED or a buzzer. The normal operating state information relating to the operating state of the watercraft, which is displayed on the display portion of the display device in a normal drive state, is displayed even when an abnormality occurs. And, after the engine is stopped, the display information being displayed on the display portion may be switched from the normal operating state information to the abnormality content information indicative of the content of the diagnostic data associated with the abnormality.

In accordance with such a configuration, when an abnormality is detected from self-diagnosis, the normal operating state information can be displayed as in the normal drive state of the watercraft.

The above and further objects and features of the invention will more fully be apparent from the following detailed description with accompanying drawings.

BRIEF DESCRIPTION OF THE DRAWINGS

FIG. 5 is a schematic view showing placement of various sensors attached to an engine and auxiliary devices mounted in the personal watercraft in FIG. 1, and connection of the sensors, the ECU, the display device, and the like;

DETAILED DESCRIPTION OF THE PREFERRED EMBODIMENTS

Hereinafter, a method and device for processing self-diagnostic information in a personal watercraft according to an embodiment of the present invention will be described with reference to the accompanying drawings.

Figure 1:
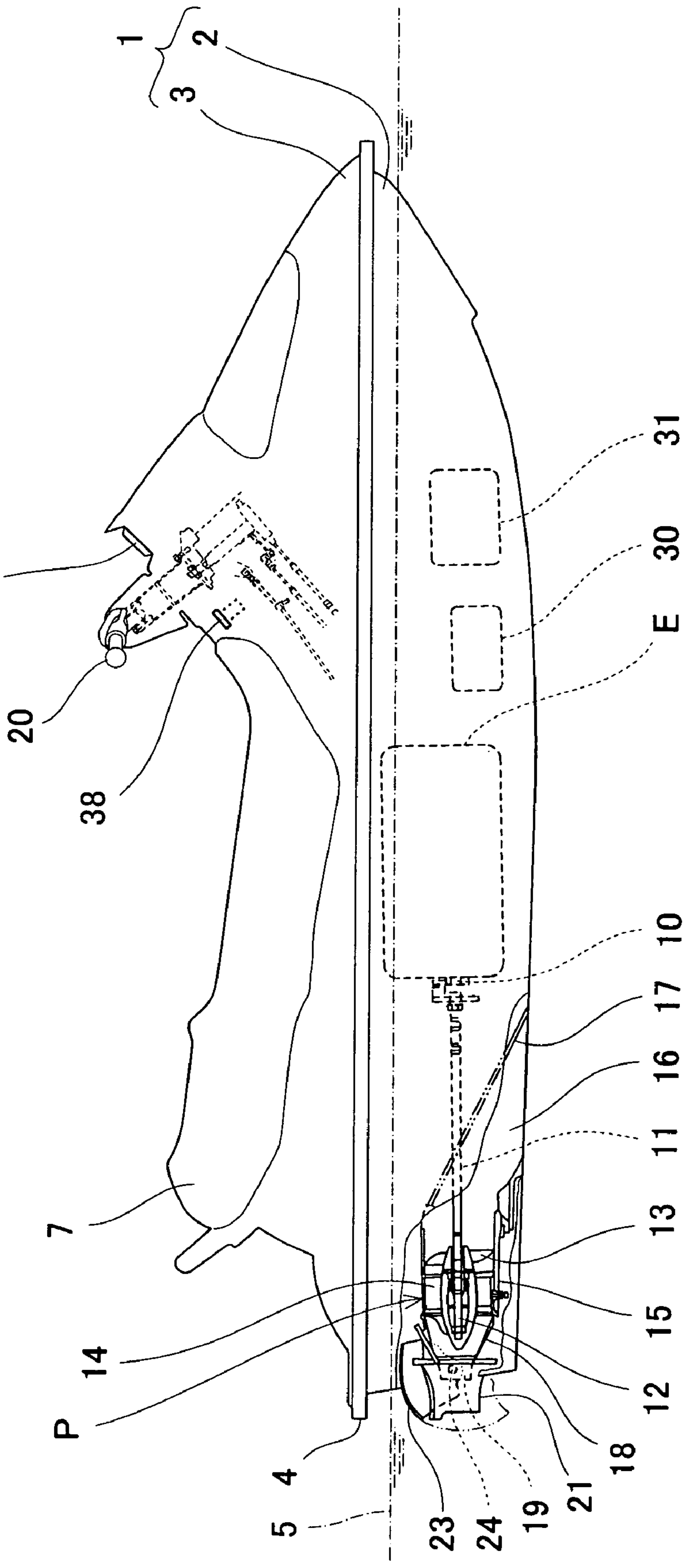
FIG. 1 is a side view of a personal watercraft according to an embodiment of the present invention.

The personal watercraft in FIG. 1 is a straddle-type personal watercraft provided with a seat 7 straddled by an operator. A body 1 of the watercraft comprises a hull 2 and a deck 3 covering the hull 2 from above. A line at which the hull 2 and the deck 3 are connected over the entire perimeter thereof is called a gunnel line 4. In FIG. 1, reference numeral 5 denotes a waterline while the personal watercraft is at rest on water.

Figure 2:
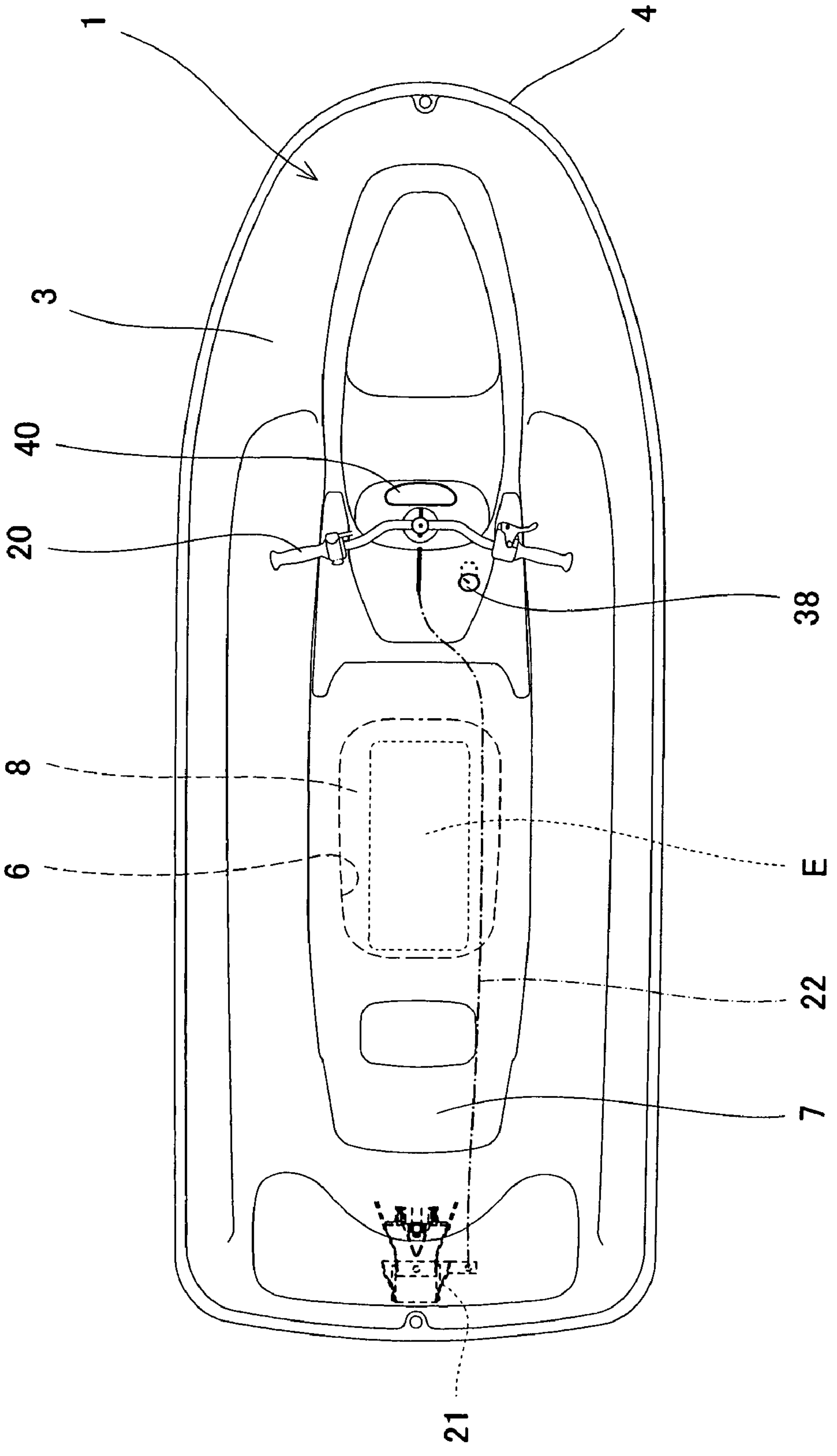
FIG. 2 is a plan view of the personal watercraft in FIG. 1.

As shown in FIG. 2, an opening 6, which has a substantially rectangular shape as seen from above is formed at a substantially center section of the deck 3 in the upper portion of the body 1 such that its longitudinal direction corresponds with the longitudinal direction of the body 1. The seat 7 is removably mounted over the opening 6.

An engine room 8 is provided in a space defined by the hull 2 and the deck 3 below the opening 6. An engine E is mounted within the engine room 8 and configured to drive the watercraft. The engine room 8 has a convex-shaped transverse cross-section and is constructed such that its upper portion is smaller than its lower portion. In this embodiment, the engine E is an in-line four-cylinder four-cycle engine.

As shown in FIG. 1, the engine E is mounted such that a crankshaft 10 extends along the longitudinal direction of the body 1. An output end of the crankshaft 10 is rotatably coupled integrally with a pump shaft 12 of a water jet pump P provided on the rear side of the body 1 through a propeller shaft 11. An impeller 13 is attached on a pump shaft 12 of the water jet pump. Fairing vanes 14 are provided behind the impeller 13. The impeller 13 is covered with a tubular pump casing 15 on the outer periphery thereof.

A water intake 16 is provided on the bottom of the body 1. The water intake 16 is connected to the pump casing 15 through a water passage 17. The pump casing 15 is connected to a pump nozzle 18 provided on the rear side of the body 1. The pump nozzle 18 has a cross-sectional area that gradually reduces rearward, and an outlet port 19 is provided on the rear end of the pump nozzle 18.

The water outside the watercraft is sucked from the water intake 16 and fed to the water jet pump P. The water jet pump P pressurizes and accelerates the water and the fairing vanes 14 guide water flow behind the impeller 13. The water is ejected through the pump nozzle 18 and from the outlet port 19, and, as the resulting reaction, the watercraft obtains a propulsion force.

A bar-type steering handle 20 is attached to a front portion of the deck 3. The steering handle 20 is connected to a steering nozzle 21 provided behind the pump nozzle 18 through a cable 22 in FIG. 2. When the rider rotates the steering handle 20 clockwise or counterclockwise, the steering nozzle 21 is swung toward the opposite direction so that the ejection direction of the water being ejected through the pump nozzle 18 can be changed, and the watercraft can be correspondingly turned to any desired direction while the water jet pump P is generating the propulsion force.

As shown in FIG. 1, a bowl-shaped reverse deflector 23 is provided on an upper portion of the steering nozzle 21 on the rear side of the body 1 such that it can vertically swing around a horizontally mounted swinging shaft 24. The deflector 23 is swung downward to a lower position around the swinging shaft 24 to deflect the ejected water from the steering nozzle 21 forward, and as the resulting reaction, the personal watercraft moves rearward.

As shown in FIG. 1, an ECU (electric control unit) 30 configured to control an operation of the engine E and a battery 31 are equipped within the body 1. The ECU 30 is configured to receive signals detected by a number of sensors attached to the engine E and auxiliary devices and to perform control processes for various purposes based on the received signals as described later.

Figure 3:
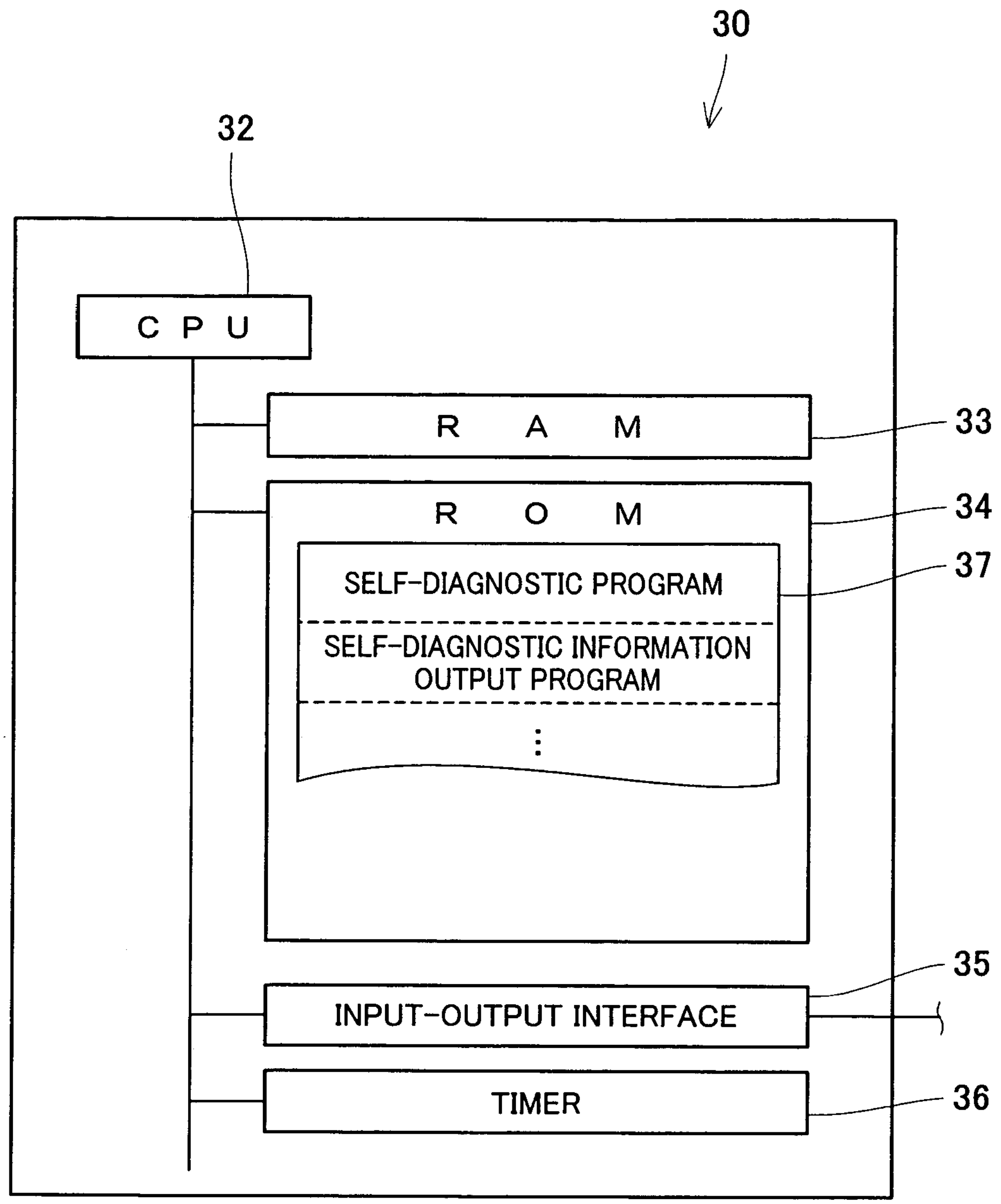
FIG. 3 is a block diagram schematically showing a configuration of an electric control unit (ECU) equipped in the personal watercraft in FIG. 1.

FIG. 3 is a block diagram schematically showing a configuration of the ECU 30. As shown in FIG. 3, the ECU 30 includes a CPU (central processing unit) 32, a RAM (random access memory) 33, a ROM (read only memory) 34, an input-output interface 35, a timer 36, and so forth. While the term CPU is used to refer to element 32, it shall be understood that other processor architectures may also be used, and processor 32 may alternatively include one or more co-processors, parallel processors, or may be another form of processor that is not a central processing unit. While RAM and ROM are used to refer to elements 33 and 34, it will be appreciated that virtually any non-volatile memory device may be used for ROM 34, and other forms of volatile memory may be used for RAM 33.

The CPU 32 is configured to perform calculation based on data loaded from the RAM 33 or the ROM 34 or data input externally of the ECU 30 through the input-output interface 35, and to output calculation data. The RAM 33 is configured to temporarily store the calculation data from the CPU 32 or the data externally input. The input-output interface 35 is connected to the sensors (see FIG. 5) attached to the engine E and the auxiliary devices and a display device (see FIG. 4) to allow output and reception of signal. The timer 36 is configured to measure time of, for example, a control process performed by the ECU 30 in accordance with an instruction from the CPU 32 and to output the time to the CPU 32.

Figure 9:
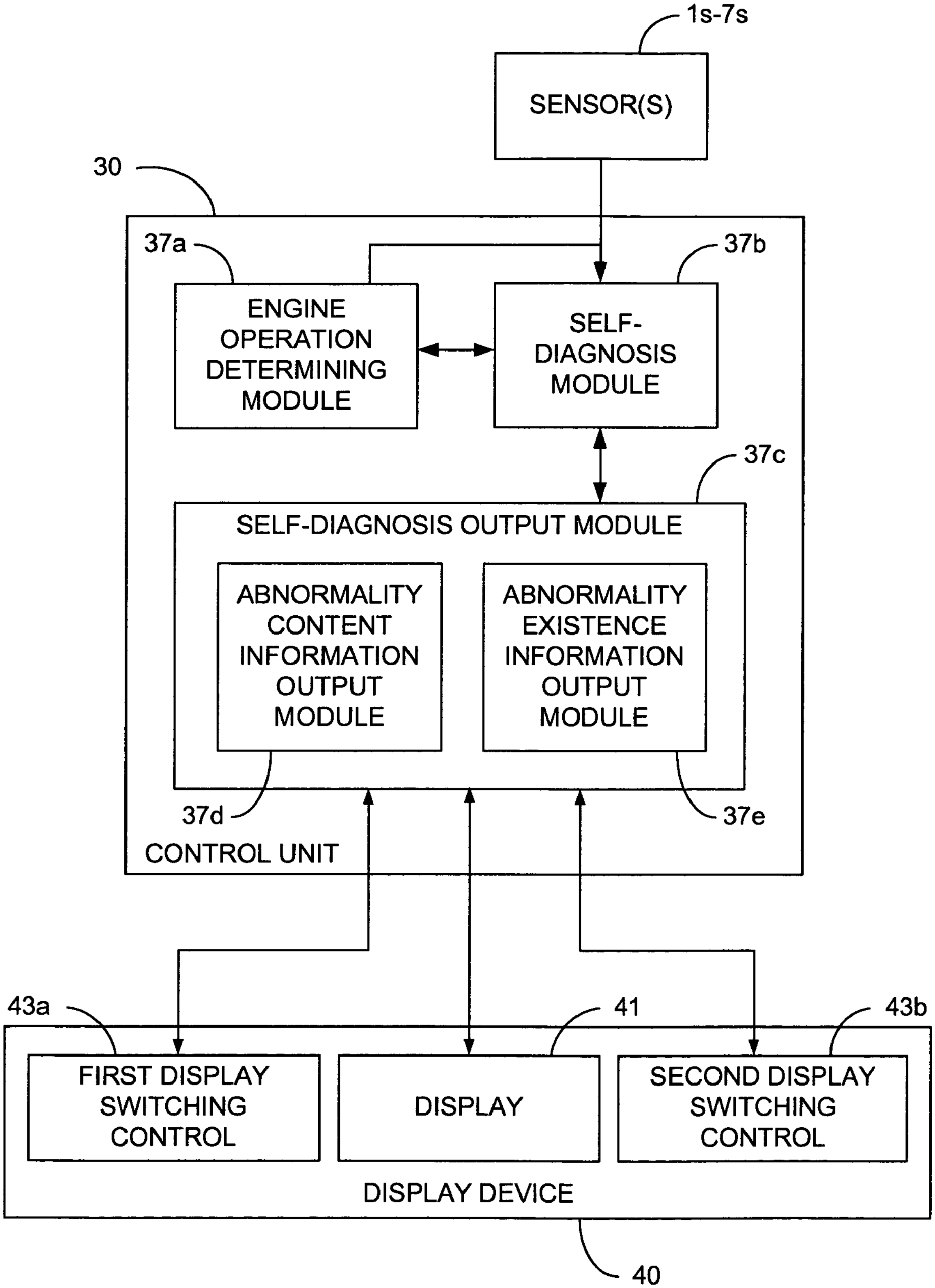
FIG. 9 is a schematic view showing various modules of the ECU.

ROM 34 contains at least one program 37 configured to be executed by CPU 32 during operation of ECU 30. As shown in FIG. 9, program 37 typically includes one or more program modules configured to perform designated functions. These program modules may include application program modules configured to be executed by CPU 32 using portions of RAM 33, as well as data and other resources utilized by the application program modules.

Program 37 typically includes an engine operation determining module 37*a* configured to make an operation condition determination of whether or not an operation condition of the engine meets a predetermined operation condition. Program 37 further typically includes a self-diagnostic program module 37*b* configured to self-diagnose an operating state of the watercraft, and a self-diagnostic information output program module 37*c* configured to output information relating to self-diagnosis, etc. Self-diagnostic information output program module 37*c* typically includes an abnormality content information output module 37*d* configured to output abnormality content information indicative of the content of the diagnostic data associated with the abnormality to the display device, when the operation condition of the engine meets a predetermined operation condition, and an abnormality existence information output module 37*e* configured to output abnormality existence information indicative of existence of the abnormality to the display device, when the operation condition of the engine does not meet the predetermined operation condition.

Typically, ECU 30 is configured to execute all of the modules 37*a*–37*e*. Alternatively, the ECU 30 may be replaced by a plurality of control units, each of which is configured to store and execute a respective one or more of the modules.

As shown in FIGS. 1 and 2, an energizing switch 38 is provided behind and adjacent the steering handle 20 to allow electric power to be supplied from the battery 31 to the ECU 30 by inserting and rotating a key. A display device 40 is provided in front of and in the vicinity of the steering handle 20. The display device 40 is comprised of an instrument panel positioned to allow the operator straddling the seat 7 to easily visually check the panel, a drive circuit configured to light a lamp provided on the instrument panel, to be described later, and so on. The display device 40 is connected to the input-output interface 35 of the ECU 30 and configured to display various information based on signals input from the ECU 30.

Figure 4:
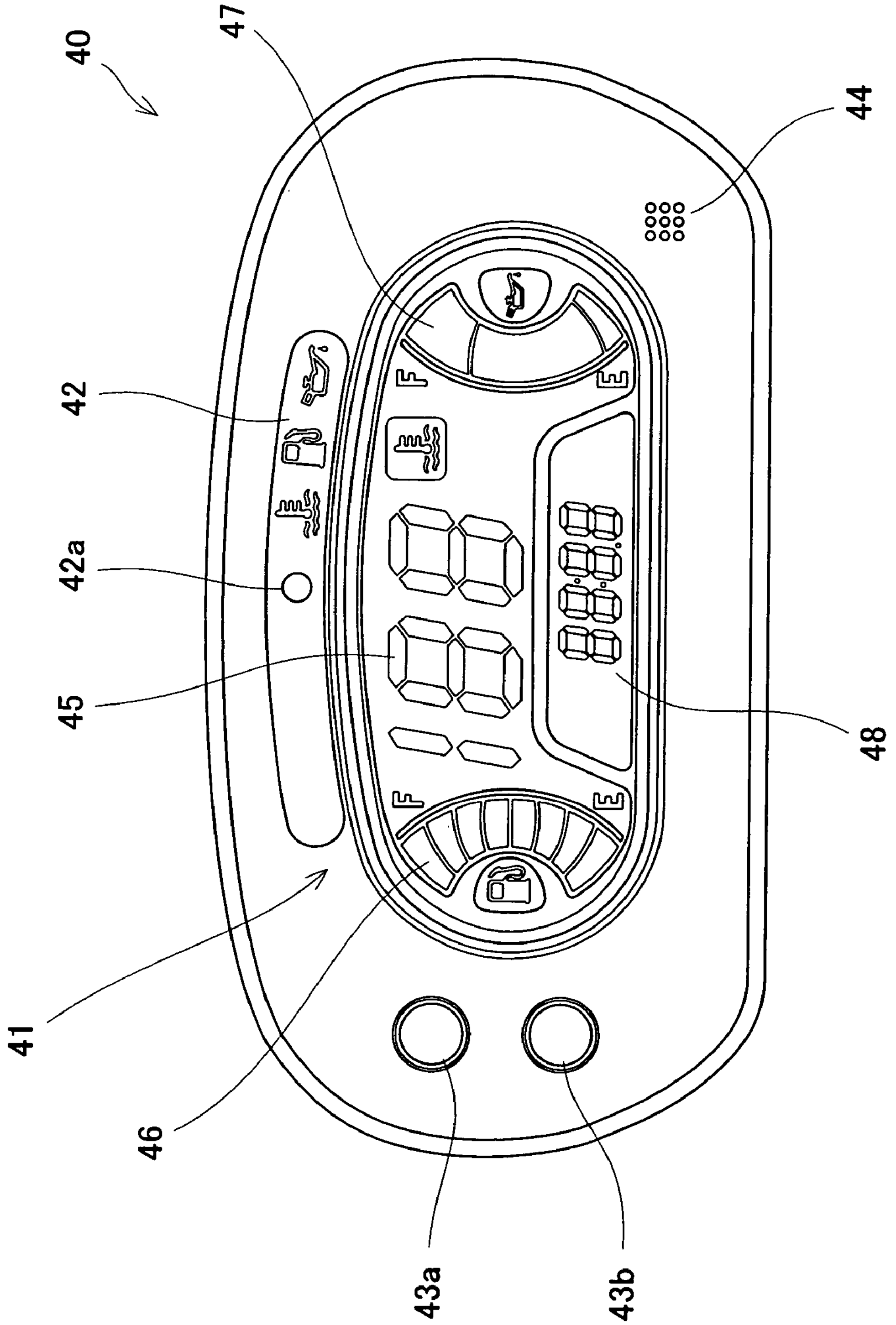
FIG. 4 is a view showing an external appearance of a display device equipped in the personal watercraft in FIG. 1.

FIG. 4 shows an external appearance of the display device 40, and an external appearance of the instrument panel visually checked by the operator. As shown in FIG. 4, the display device 40 includes a liquid crystal display portion 41 that displays various information, a warning display portion 42 having a lamp 42*a* formed by a LED (light emitting diode), a first button 43*a*, a second button 43*b*, a speaker 44, and so on.

The liquid crystal display portion 41 includes a speed display portion 45 that displays a travel speed of the watercraft, a fuel display portion 46 that displays an amount of remaining fuel, and an oil display portion 47 that displays an amount of remaining oil. The liquid crystal display portion 41 further includes a multi-display portion 48 that displays normal operating state information relating to a normal operating state of the watercraft such as time, a travel distance, and an engine speed of the engine E, which are required in the watercraft during a normal drive, and diagnostic data information relating to self-diagnosis, which is obtained by the ECU 30 when an abnormality occurs in the watercraft. The diagnostic data information includes abnormality content information indicative of the content of the abnormality and abnormality existence information indicative of the existence of the abnormality.

The first button (first display switching control) 43*a* serves to sequentially perform switching of abnormality content information for a plurality of abnormalities occurring in the watercraft and to display this information on the multi-display portion 48, when it is determined by the self-diagnosis that the abnormalities have occurred in the watercraft. The second button (second display switching control) 43*b* is manually operated to allow switching between the diagnostic data information (abnormality content information or abnormality existence information) and the normal operating state information on the multi-display portion 48. As described later in detail, upon occurrence of an abnormality in the watercraft, the abnormality content information or the abnormality existence information is automatically displayed on the multi-display portion 48. Under this condition, by operating the second button 43*b*, the abnormality content information or the abnormality existence information that is being displayed on the multi-display portion 48, is switched to the normal operating state information. Then, by re-operating the second button 43*b*, the normal operating state information is switched to the abnormality content information or the abnormality existence information.

Figure 5:
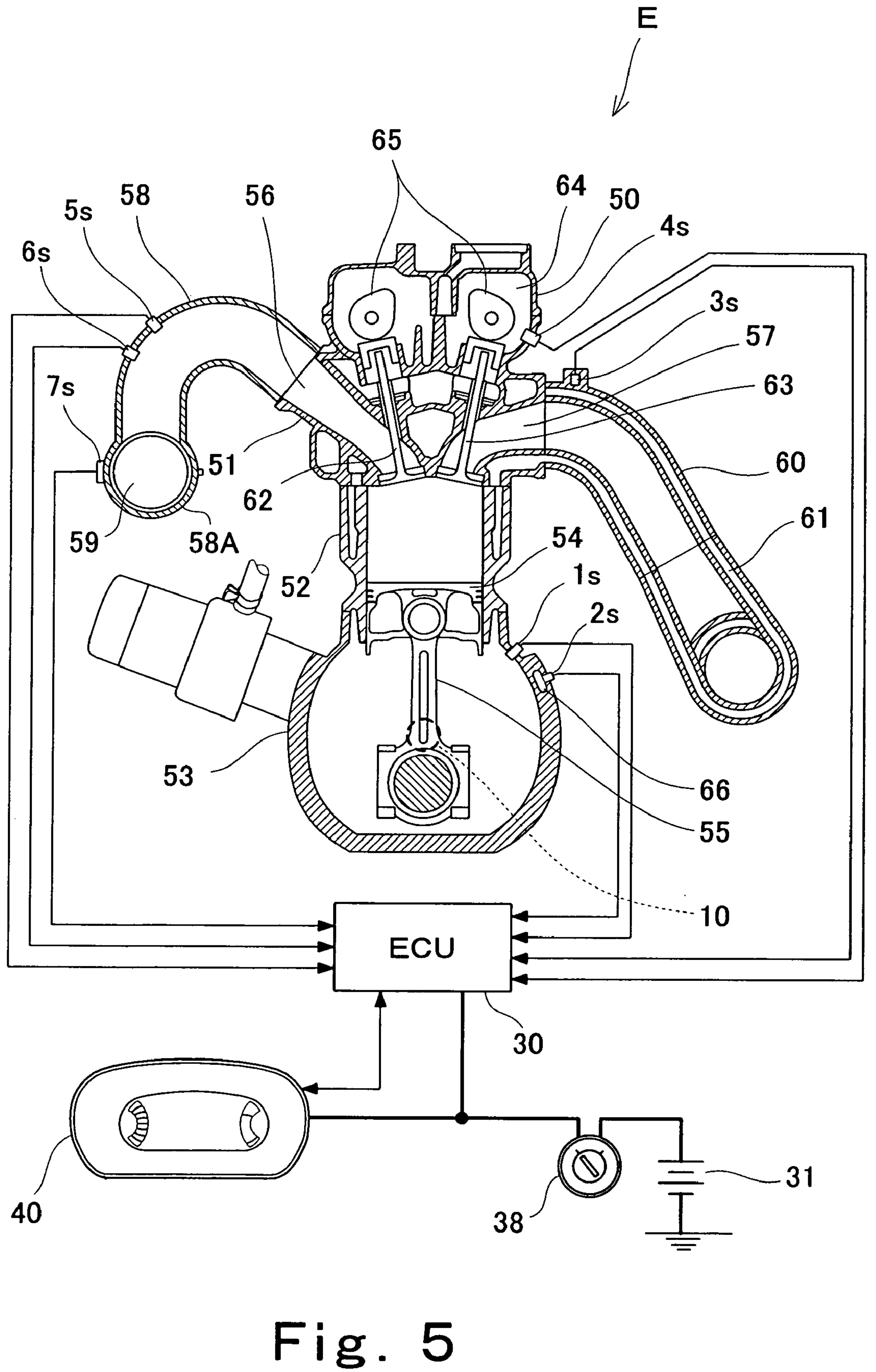

FIG. 5 is a schematic view showing a construction of the engine E, placement of various sensors attached to an engine E and the auxiliary devices, and connection of the sensors, the ECU 30, the display device 40, and the like.

As shown in FIG. 5, the engine E mainly includes a cylinder head 51 covered with a cylinder head cover 50 from above, a cylinder block 52 connected to a lower portion of the cylinder head 51, and a crankcase 53 connected to a lower portion of the cylinder block 52.

Pistons 54 are provided within the cylinder block 52. The pistons 54 are each connected to the crankshaft 10 through a connecting rod 55. The pistons 54 are each configured to vertically reciprocate within the cylinder block 52 in cooperation with rotation of the crankshaft 10. When the crankshaft 10 rotates, a generator (not shown) generates an electric power with which the battery 31 is charged.

Within the cylinder head 51, air-intake ports 56 form an air-intake passage and exhaust ports 57 form an exhaust passage. Air-intake pipes 58 extend from one end portions of the air-intake ports 56 and are collected into a single air-intake pipe 58A. A throttle valve 59 is provided in the air-intake pipe 58A. Each exhaust pipe 60 extends from one end of a corresponding one of the exhaust ports 57 and communicates with the outside of the watercraft through a muffler (not shown) or the like. The exhaust pipe 60 has a double-walled structure provided with a water jacket 61 around an exhaust gas passage of the exhaust pipe 60. Cooling water flows within the water jacket 61 to cool an exhaust gas flowing within the exhaust gas passage.

Each air-intake valve 62 is provided in an opposite end of a corresponding one of the air-intake ports 56 to open and close the air-intake port 56. Each exhaust valve 63 is provided in an opposite end of a corresponding one of the exhaust ports 57 to open and close the exhaust port 57.

A cam chamber 64 is formed between the cylinder head cover 50 and the cylinder head 51. Cam shafts 65 are provided within the cam chamber 64. The cam shafts 65 are configured to rotate in cooperation with the crankshaft 10 in a cycle half as long as that of the crankshaft 10. This allows the air-intake valve 62 and the exhaust valve 63 to open and close the air-intake port 56 and the exhaust port 57 at predetermined timings, respectively, thereby controlling both the flow of the taken-in air and the flow of the exhaust gas.

The sensors are attached to the engine E, the air-intake pipe 58, the exhaust pipe 60, and the auxiliary devices. Specifically, as shown in FIG. 5, a crank position sensor 1*s* is attached to a wall portion of the crankcase 53 to detect a rotational angle of the crankshaft 10. An oil gallery 66 is provided within a wall portion of the crankcase 53 to form an oil passage through which oil circulating within the engine E flows. An oil-pressure sensor 2*s* is provided in the oil gallery 66 to detect a pressure of the oil flowing within the oil gallery 66.

A wall-temperature sensor 3*s* is attached to an outer wall portion of the double-walled structure of the exhaust pipe 60 to detect a wall temperature of the exhaust pipe 60. A cam-angle sensor 4*s* is attached to the cylinder head 51 to detect a rotational angle of the cam shafts 65.

An air-intake temperature sensor 5*s* and a boost sensor 6*s* are attached to the wall portion of the air-intake pipe 58 to detect a temperature of the taken-in air and to detect a boost pressure of the taken-in air, respectively. Further, a throttle position sensor 7*s* is attached in the vicinity of the throttle valve 59 to detect an open position of the throttle valve 59.

The above-mentioned sensors 1*s* to 7*s* are electrically connected to the ECU 30 as shown in FIG. 5, and the detected signals are sent to the ECU 30. The ECU 30 is electrically connected to the display device 40 and configured to cause the display device 40 to display information relating to the operating state of the watercraft such as a travel speed and an engine speed based on the detected signals from the sensors 1*s* to 7*s*.

The ECU 30 and the display device 40 are connected to the battery 31 by an electric connection through the energizing switch 38. Upon turning on the energizing switch 38, electric power is supplied from the battery 31 to the ECU 30 and the display device 40 while, upon turning off the energizing switch 38, supply of the electric power from the battery 31 is stopped.

A self-diagnostic information processing device according to this embodiment is comprised of the ECU 30, the sensors 1*s* to 7*s*, the display device 40, and the like.

Figure 6:
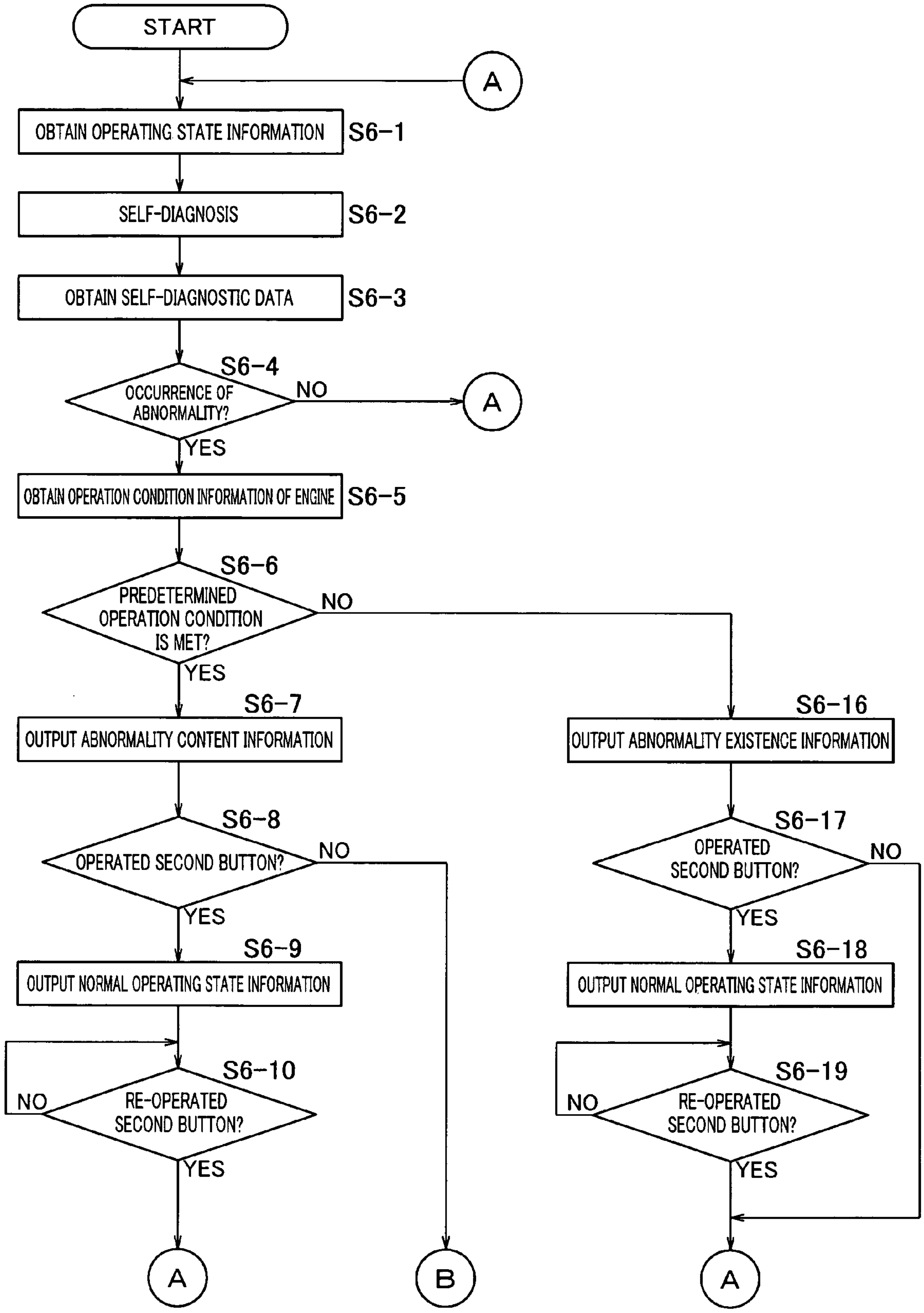
FIG. 6 is a flowchart showing a control process performed by the ECU when an operating state of the watercraft is self-diagnosed in the personal watercraft in FIG. 1.
Figure 7:
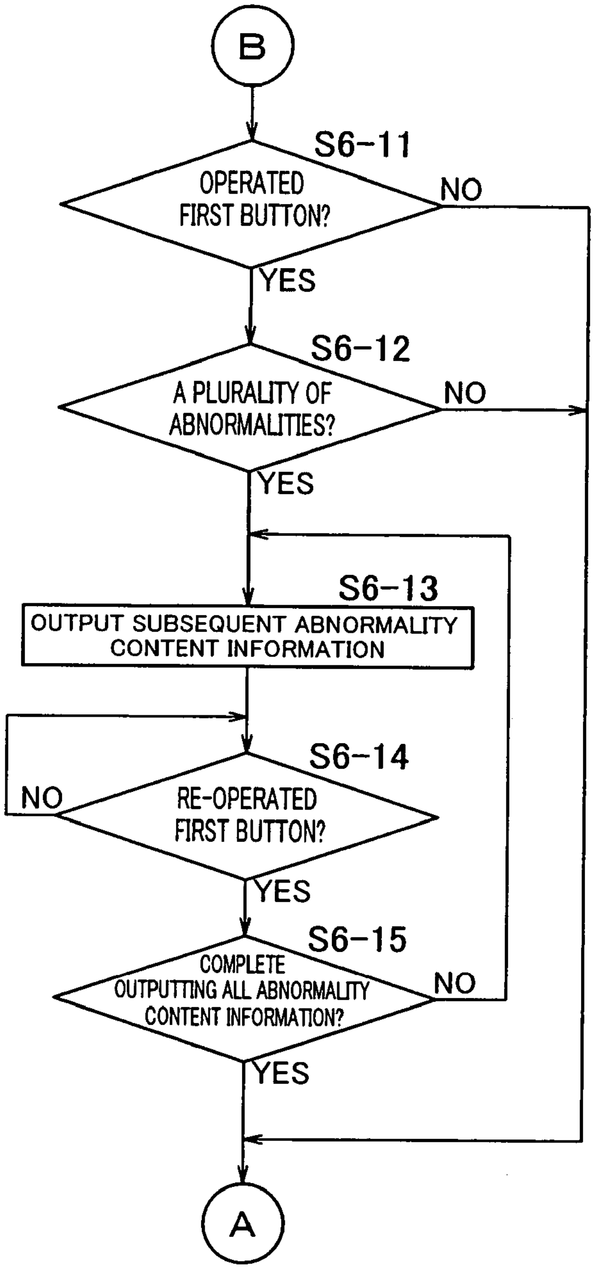
FIG. 7 is a flowchart showing a control process performed by the ECU when an operating state of the watercraft is self-diagnosed in the personal watercraft in FIG. 1.

FIGS. 6 and 7 are flowcharts showing a control process performed by the ECU 30 when the operating state of the watercraft is self-diagnosed. Within the ECU, Steps S6-1 through S6-4 may be performed by the self diagnosis module 37*b*, Steps S6-5 and S6-6 may be performed by engine operation determining module 37*a*, Steps S6-7 through S6-15 may be performed by abnormality content information output module 37*d* in cooperation with self diagnosis output module 37*c*, and Steps S6-16 through S6-19 may be performed by abnormality existence information output module 37*e* in cooperation with self diagnosis output module 37*c*. Of course, other suitable module configurations may alternatively be used to implement the processes shown in FIGS. 6 and 7.

With reference to the flowchart in FIG. 6, the ECU 30 obtains detected signals (information relating to the operating state of the watercraft) from the sensors 1*s* to 7*s* attached to the engine E and the auxiliary devices (S6-1). Based on the detected signals, the ECU 30 self-diagnoses the operating state of the watercraft (S6-2), and obtains self-diagnostic data (S6-3). The ECU 30 performs these self-diagnostic processes according to the self diagnosis module 37*b* of the self-diagnostic program 37 (see FIGS. 3 and 9) stored in the ROM 34. In the Step S6-2, the ECU 30 compares the detected signals obtained in the Step S6-1 to thresholds preset and prestored in the ROM 34 or the RAM 33.

Next, the ECU 30 determines whether or not an abnormality exists in the self-diagnostic data (S6-4). If it is determined that no abnormality exists (S6-4: NO), the ECU 30 repeats the process from the Step S6-1. On the other hand, if it is determined that some abnormality exists (S6-4: YES), the ECU 30 advances the process to obtain operation condition information of the engine E (S6-5).

Further, the ECU 30 advances the process to an operation condition determination step of the engine E, and determines whether the operation condition of the engine E is in a predetermined operation condition (S6-6). In this embodiment, a stopped state of the engine E is set as the predetermined operation condition based on the engine speed, which is obtained from the detected signal from the crank position sensor 1*a* (see FIG. 5). If it is determined that the predetermined operation condition is met, i.e., the engine E is in the stopped state (S6-6: YES), the ECU 30 outputs abnormality content information indicative of a content of the obtained abnormality to the display device 40 (S6-7). For example, the abnormality content information may be displayed on the multi-display portion 48 (see FIG. 4) of the display device 40, instead of the normal operating state information displayed during a normal drive state.

In this embodiment, while the ECU 30 decides whether or not to output the abnormality content information to the display device 40, according to whether or not the engine E is in a stopped state in the operation condition determination step of the engine E (S6-6), this may be done whether or not another set predetermined operation condition is met, for example, the engine E is in an idle state.

As the abnormality content information output to the display device 40 in the Step S6-7, a code made up of a short character string (e.g., "E-01") may be assigned to individual abnormality content and output. Alternatively, a relatively long character string (e.g., "PRESSURE OF LUBRICATING OIL IS LOW") may be displayed by scrolling the character strings. In this way, the operator can identify abnormality information even on the multi-display portion 48 capable of displaying only a limited number of characters at a time.

After outputting the abnormality content information in the Step S6-7, the ECU 30 determines whether or not the operator has operated the second button 43*b* (see FIG. 4) to switch from the abnormality content information to the normal operating state information (S6-8). If it is determined that the operator has operated the second button 43*b* (S6-8: YES), the ECU 30 outputs the normal operating state information to the display device 40 instead of the abnormality content information (S6-9). And, if it is determined that the operator has re-operated the second button 43*b* (S6-10: YES), the ECU 30 repeats the process from the Step S6-1.

If it is determined that the operator has not operated the second button 43*b* in the Step S6-8 (S6-8: NO), the ECU 30 further determines whether or not the operator has operated the first button 43*a* to sequentially switch a plurality of abnormality content information (S6-11) in FIG. 7. If it is determined that the operator has operated the first button 43*a* (S6-11: YES), the ECU 30 determines whether or not the self-diagnostic information obtained in the Step S6-3 (FIG. 6) includes a plurality of abnormalities (S6-12). If it is determined that the self-diagnostic information includes the plurality of abnormalities (S6-12: YES), the ECU 30 outputs subsequent abnormality content information (e.g., "E-02") instead of the abnormality content information output in the Step S6-7 (e.g., "E-01") (S6-13).

After switching the abnormal content information to be output in Step S6-13, the ECU 30 determines whether or not the operator has re-operated the first button 43*a*, to further output subsequent abnormality content information (S6-14). And, if it is determined that the operator has re-operated the first button 43*a* (S6-14: YES), the ECU 30 determines whether or not the ECU 30 has completed outputting all of the plurality of abnormal content information (S6-15). If it is determined that the ECU 30 has not yet completed outputting all of the plurality of abnormal content information (S6-15: NO), the ECU 30 returns the process to the Step S6-13 and outputs subsequent abnormality content information. As shown in the Steps S6-11 to S6-15, when the diagnosis information includes a plurality of abnormalities, the ECU 30 sequentially outputs individual abnormality content information to the display device 40, one by one, every time the first button 43*a* is operated. After outputting all the abnormality content information (S6-15: YES), the ECU 30 repeats the process from the Step S6-1 in FIG. 6.

As shown in FIG. 7, if it is determined that the operator has not operated the first button 43*a* (S6-11: NO), or if it is determined that there is only one abnormality in the Step S6-12 after it has been determined that the first button 43*a* has been operated in the Step S6-11, the ECU 30 repeats the process from the Step S6-1 in FIG. 6.

On the other hand, if it is determined that the engine E is not in the predetermined operation condition (stopped state in this embodiment) in the operation condition determination step (S6-6: NO), the ECU 30 outputs abnormality existence information indicative of existence of an abnormality in the self-diagnostic data, to the display device 40 (S6-16), which displays this information on the multi-display portion 48. After outputting the abnormality existence information, the ECU 30 determines whether or not the operator has operated the second button 43*b* (FIG. 4) to switch from the abnormality existence information to the normal operating state information (S6-17). If it is determined that the operator has operated the second button 43*b* (FIG. 4) (S6-17: YES), the ECU 30 outputs the normal operating state information to the multi-display portion 48 of the display device 40 instead of the abnormality existence information (S6-18).

If it is determined that the operator has not operated the second button 43*b* in the Step S6-17 (S6-17: NO), or if it is determined that the operator has re-operated the second button 43*b* after outputting the normal operating state information in the Step S6-18 (S6-19: YES), the ECU 30 repeats the process from the Step S6-1 in FIG. 6.

In a case where a plurality of abnormalities are detected from the self-diagnosis, abnormality content information of these abnormalities may be sequentially displayed by switching from one to another every time the operator operates the first button 43*a*, or otherwise, all of these information may be displayed by scrolling on the multi-display portion 48 of the display device 40. Further, the timer 36 (see FIG. 3) equipped in the ECU 30 may be used to allow the abnormality content information to be automatically output one by one, each for a predetermined time period.

Figure 8:
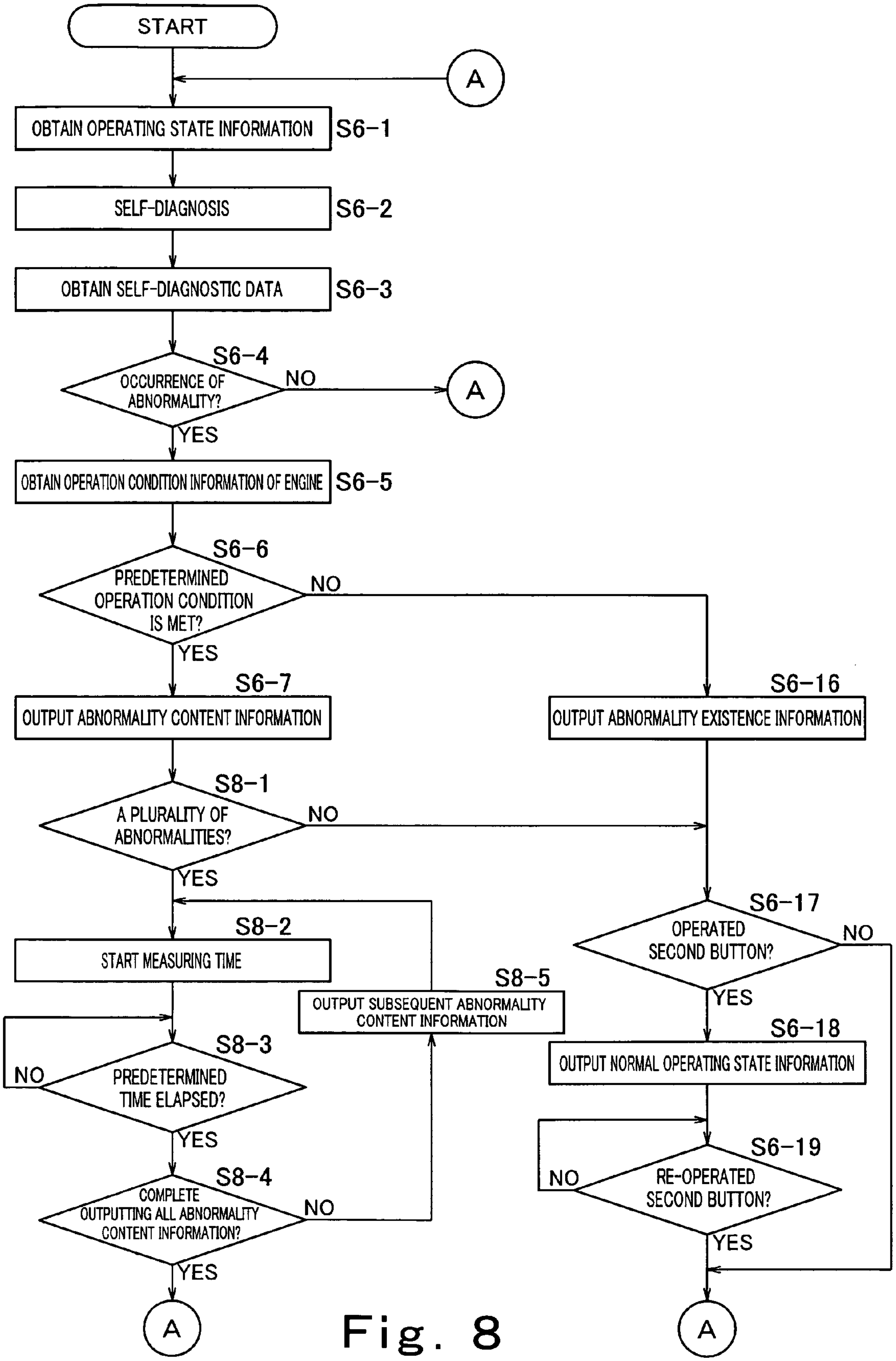
FIG. 8 is a flowchart showing another control process performed by the ECU.

Subsequently, an example of a process for automatically outputting the abnormality content information one by one, each for a predetermined time period, will be described with reference to the flowchart in FIG. 8. It will be appreciated that Steps S8-1 through S8-4 may be performed by the abnormality content information module 37*d* in cooperation with the self diagnosis output module 30*d*. As shown in FIG. 8, when it is determined that an abnormality has occurred in the operating state of the watercraft (S6-4: YES) and when it is determined that a predetermined operation condition is met, i.e., the engine E is in a stopped state (in this embodiment) (S6-6: YES), the ECU 30 outputs the abnormality content information to the display device 40 (S6-7). Then, the ECU 30 determines whether or not a plurality of abnormalities are included in the self-diagnostic information obtained in self-diagnosis in the Step S6-2 (S8-1). And, if it is determined that a plurality of abnormalities exist (S8-1: YES), the ECU 30 activates the timer 36, which thereby starts measuring time (S8-2). When it is determined that there is only one abnormality in Step S8-1 (S8-1: NO), the ECU 30 performs the process from the Step S6-17 to Step S6-19.

After the Step S8-2, the ECU 30 determines whether or not a predetermined time period has elapsed (S8-3), and if it is determined that the predetermined time period has not elapsed (S8-3: NO), the ECU 30 repeats the process in the Step S8-3. If it is determined that the predetermined time period has elapsed (S8-3: YES), the ECU 30 determines whether or not the ECU 30 has completed outputting all of the plurality of abnormality content information (S8-4). If it is determined that the ECU 30 has not completed outputting all of the information (S8-4: NO), the ECU 30 outputs abnormality content information which has not been output yet (S8-5), and performs the process from the Step S8-2. On the other hand, if it is determined that the ECU 30 has completed outputting all the information in the Step S8-4 (S8-4: YES), the ECU 30 repeats the process from the Step S6-1.

If it is determined that the predetermined operation condition is not met, i.e., the engine E is not in a stopped state in this embodiment in the operation condition determination step (S6-6: NO), the ECU 30 performs the process from Step S6-16 to Step S6-19. In FIG. 8, the same reference numerals as those in FIG. 7 denote the same or corresponding parts or processes, which will not be further described.

When the ECU 30 outputs the abnormality existence information, typically the abnormality existence information is output instead of the normal operating state information being displayed on the display device 40 during a normal drive state. Alternatively, both the abnormality existence information and the normal operating state information may be output simultaneously. For example, the normal operating state information may be displayed on the multi-display portion 48 of the display device 40, while the abnormality existence information may be recognized by the operator by lighting a lamp 42*a* provided on the warning display portion 42 or by issuing a sound from a speaker 44. In that case, the process (e.g., Step S6-16) for switching between the abnormality existence information and the normal operating state information may be omitted in the flowcharts shown in FIGS. 6 to 8.

As this invention may be embodied in several forms without departing from the spirit of essential characteristics thereof, the above embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A device for processing self-diagnostic information relating to an operating state of a jet-propulsion personal watercraft including an engine configured to propel the watercraft, the device being mounted in the watercraft, the device comprising:

a control unit;

a sensor configured to detect the operating state of the watercraft; and a display device equipped in the vicinity of a steering handle attached to the watercraft;

wherein the control unit includes:

an engine operation determining module configured to make an operation condition determination of whether or not an operation condition of the engine meets a predetermined operation condition;

a self-diagnosis module configured to obtain a detected signal from the sensor, to perform self-diagnosis of the operating state of the watercraft based on the obtained detected signal to obtain diagnostic data, and to make an abnormality determination of whether or not an abnormality exists in the diagnostic data; and a self-diagnostic information output module configured to output one or a plurality of diagnostic data to the display device based on a result of the abnormality determination made by the self-diagnosis module and a result of the operation condition determination made by the engine operation determining module;

wherein the display device includes a display portion configured to display a plurality of character messages associated with the diagnostic data such that the plurality of character messages are sequentially switched from one to another.

2. The device for processing self-diagnostic information according to claim 1, wherein the self-diagnostic information output module includes:

an abnormality content information output module configured to output abnormality content information indicative of the content of the diagnostic data associated with the abnormality to the display device, when the operation condition of the engine meets the predetermined operation condition, wherein the abnormality content information is configured to be displayed as at least one of the plurality of character messages on the display portion of the display device; and an abnormality existence information output module configured to output abnormality existence information indicative of existence of the abnormality to the display device, when the operation condition of the engine does not meet the predetermined operation condition.

3. The device for processing self-diagnostic information according to claim 2, wherein the predetermined operation condition is based on an engine speed of the engine.

4. The device for processing self-diagnostic information according to claim 3, wherein the predetermined operation condition is a stopped state of the engine.

5. The device for processing self-diagnostic information according to claim 2, further comprising:

a first display switching control configured to switch display information to be displayed on the display device;

wherein the self-diagnostic information output module is configured to, when the self-diagnosis module determines that a plurality of abnormalities exist, sequentially output abnormality content information indicative of contents of a plurality of diagnostic data associated with the abnormalities, based on an input signal from the first display switching control.

6. The device for processing self-diagnostic information according to claim 2, wherein the self-diagnostic information output module is configured to, when the self-diagnosis module determines that a plurality of abnormalities exist, sequentially output abnormality content information indicative of contents of a plurality of diagnostic data associated with the abnormalities one by one, each for a predetermined time period.

7. The device for processing self-diagnostic information according to claim 2, wherein the self-diagnostic information output module is configured to:

output normal operating state information relating to the operating state of the watercraft, when the self-diagnosis module determines that no abnormality exists; and output abnormality existence information indicative of existence of the abnormality or abnormality content information indicative of the content of diagnostic data associated with the abnormality, instead of the normal operating state information, when the self-diagnosis module determines that an abnormality exists.

8. The device for processing self-diagnostic information according to claim 7, further comprising a second display switching control configured to switch display information to be displayed on the display device;

wherein the self-diagnostic information output module is configured to output the normal operating state information instead of the abnormality existence information or the abnormality content information according to an input signal from the second display switching control, even when the output module is outputting the abnormality existence information or the abnormality content information.

9. The device for processing self-diagnostic information according to claim 2, wherein the self-diagnostic information output module is configured to:

output normal operating state information relating to the operating state of the watercraft, when the self-diagnosis module determines that no abnormality exists;

output the abnormality existence information along with the normal operating state information, when the self-diagnosis module determines that an abnormality exists and the abnormality existence information indicative of existence of the abnormality is to be output; and output the abnormality content information instead of the normal operating state information, when the self-diagnosis module determines that an abnormality exits and the abnormality content information indicative of the content of diagnostic data associated with the abnormality is to be output.

10. The device for processing self-diagnostic information according to claim 2, wherein the self-diagnostic informationtion output module is configured to output the abnormality content information indicative of a content of the diagnostic data associated with an abnormality to the display device in the form of character information to allow the character information to be displayed on the display portion instead of normal operating state information which relates to the operating state of the watercraft and is configured to be output when the self-diagnosis module determines that no abnormality exists.

11. The device for processing self-diagnostic information according to claim 10, wherein the normal operating state information is displayed on the display portion in the form of the character information.

12. A device for processing self-diagnostic information relating to an operating state of a jet-propulsion personal watercraft including an engine configured to propel the watercraft, the device being mounted in the watercraft, the device comprising:

a control unit;

a sensor configured to detect the operating state of the watercraft; and a display device equipped in the vicinity of a steering handle attached to the watercraft;

a first display switching control configured to switch display information to be displayed on the display device;

wherein the control unit includes:

an engine operation determining module configured to make an operation condition determination of whether or not an operation condition of the engine meets a predetermined operation condition;

a self-diagnosis module configured to obtain a detected signal from the sensor, to perform self-diagnosis of the operating state of the watercraft based on the obtained detected signal to obtain diagnostic data, and to make an abnormality determination of whether or not an abnormality exists in the diagnostic data; and a self-diagnostic information output module configured to output the diagnostic data to the display device based on a result of the abnormality determination made by the self-diagnosis module and result of the operating condition determination made by the self-diagnosis module and a result of the operation condition determination made by the engine operation determining module; and wherein the self-diagnostic information output module includes:

an abnormality content information output module configured to output abnormality content information indicative of the content of the diagnostic data associated with the abnormality to the display device, when the operation condition of the engine meets the predetermined operation condition; and an abnormality existence information output module configured to output abnormality existence information indicative of existence of the abnormality to the display device, when the operation condition of the engine does not meet the predetermined operation condition; and wherein the abnormality content information output module is configured to, when the self-diagnosis module determines that a plurality of abnormalities exist, sequentially output abnormality content information indicative of contents of a plurality of diagnostic data associated with the abnormalities, based on an input signal from the first display switching control.

13. A device for processing self-diagnostic information relating to an operating state of a jet-propulsion personal watercraft including an engine configured to propel the watercraft, the device being mounted in the watercraft, the device comprising:

a control unit;

a sensor configured to detect the operating state of the watercraft; and a display device equipped in the vicinity of a steering handle attached to the watercraft;

wherein the control unit includes:

an engine operation determining module configured to make an operation condition determination of whether or not an operation condition of the engine meets a predetermined operation condition;

a self-diagnosis module configured to obtain a detected signal from the sensor, to perform self-diagnosis of the operating state of the watercraft based on the obtained detected signal to obtain diagnostic data, and to make an abnormality determination of whether or not an abnormality exists in the diagnostic data; and a self-diagnostic information output module configured to output the diagnostic data to the display device based on a result of the abnormality determination made by the self-diagnosis module and a result of the operation condition determination made by the engine operation determining module;

wherein the self-diagnostic information output module includes:

an abnormality content information output module configured to output abnormality content information indicative of the content of the diagnostic data associated with the abnormality to the display device, when the operation condition of the engine meets the predetermined operation condition; and an abnormality existence information output module configured to output abnormality existence information indicative of existence of the abnormality to the display device, when the operation condition of the engine does not meet the predetermined operation condition; and wherein the self-diagnostic information output module is configured to:

output normal operating state information relating to the operating state of the watercraft, when the self-diagnosis module determines that no abnormality exists;

output the abnormality existence information along with the normal operating state information, when the self-diagnosis module determines that an abnormality exists and the abnormality existence information indicative of existence of the abnormality is to be output; and output the abnormality content information instead of the normal operating state information, when the self-diagnosis module determines that an abnormality exists and the abnormality content information indicative of the content of diagnostic data associated with the abnormality is to be output.

* * * * *